US008320875B2

(12) United States Patent
Musgrove et al.

(10) Patent No.: US 8,320,875 B2
(45) Date of Patent: Nov. 27, 2012

(54) EMERGENCY COMMUNICATION RECOGNITION

(75) Inventors: Charles Musgrove, Henderson, NV (US); Brian Daly, Seattle, WA (US); Dewayne Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 51 days.

(21) Appl. No.: 12/913,534

(22) Filed: Oct. 27, 2010

(65) Prior Publication Data

US 2012/0108196 A1 May 3, 2012

(51) Int. Cl.
*H04L 12/16* (2006.01)
*G05F 5/00* (2006.01)
(52) U.S. Cl. ............... 455/404.1; 370/259; 323/299
(58) Field of Classification Search ............... 455/404.1
See application file for complete search history.

(56) References Cited

U.S. PATENT DOCUMENTS

| | | | |
|---|---|---|---|
| 2009/0215424 A1* | 8/2009 | Petite | 455/404.1 |
| 2010/0003949 A1* | 1/2010 | Ray et al. | 455/404.1 |
| 2011/0148383 A1* | 6/2011 | Mullen et al. | 323/299 |
| 2011/0267984 A1* | 11/2011 | Arora | 370/259 |

* cited by examiner

*Primary Examiner* — Kent Chang
*Assistant Examiner* — Ngan Pham Lu
(74) *Attorney, Agent, or Firm* — Woodcock Washburn LLP

(57) ABSTRACT

Emergency communication initiated from an internet protocol enabled device may be recognized and established. An address representative of a designated recipient with which communication is to be established may be provided to a first communication service operating on the internet protocol enabled device, such as a wireless mobile device. The communication may be a non-voice communication or a voice communication. The communication may be determined to be indicative of an emergency. The communication may be established with a recipient associated with the designated recipient address via a second communication service operating on the internet protocol enabled device and a predetermined network upon the communication being indicative of an emergency. The predetermined network may provide the communication between the internet protocol enabled device and the recipient securely.

19 Claims, 10 Drawing Sheets

EMERGENCY COMMUNICATION RECOGNITION

BACKGROUND

Users of wireless internet protocol (IP) enabled mobile devices, such as cell phones, may encounter situations in which contact with emergency services organizations may be required. For example, a mobile device user may be confronted with fires, someone who has poisoned themself, accidents, weather related emergencies, some form of criminal activity, or the like. A mobile device user (or "subscriber") may contact an appropriate emergency services provider, such as the fire department, a poison control center, an ambulance service, or a public safety answering point (PSAP) such as a "911" center in order to report the emergency, summon help, and/or obtain useful information to deal with the emergency.

The mobile device user may contact the appropriate emergency services provider via verbal or non-verbal means (or voice or non-voice means), such as voice over IP (VoIP) or texting. Also, the mobile device user's communication may be conveyed to the emergency services provider via a number of functions or service providers other than the network, functions, and services provided by the mobile device operator. For example, non-verbal emergency communications may be provided by third-party functions such as the messaging provided by AOL Instant Messenger, Yahoo! Messenger, or Microsoft Windows Live Messenger, among others. Also, verbal emergency communications may be provided by third party providers like Skype or Vonage, among others.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Embodiments contemplate that mobile device operator based networks, functions, and services may provide confidentially, security, and privacy during emergency voice or non-voice communications, whereas emergency communications made via third party based communication functionalities and services are not provided with confidentially, security, and privacy.

Embodiments contemplate methods of establishing communication initiated from an internet protocol enabled device. Methods may include providing an address of a designated recipient with which a communication is to be established to a first communication service operating on the internet protocol enabled device and determining whether the communication is indicative of an emergency. Methods may also include establishing the communication with at least one recipient associated with the designated recipient address via a second communication service operating on the internet protocol enabled device and at least one predetermined network upon the communication being determined to be indicative of an emergency.

Embodiments contemplate methods of configuring an internet protocol based device. Methods may include configuring a processor portion of the internet protocol enabled device to provide an address of a designated recipient with which a communication is to be established to a first communication service operating on the internet protocol enabled device. Methods may also include configuring the processor portion to determine whether the communication is indicative of an emergency. Methods may further include configuring a communications portion of the internet protocol enabled device to establish the communication with at least one recipient associated with the designated recipient address via a second communication service operating on the internet protocol enabled device and at least one predetermined network upon the communication being determined to be indicative of an emergency.

Embodiments contemplate an internet protocol enabled device that may include a processor portion that may be configured to provide an address of a designated recipient with which a communication is to be established to a first communication service operating on the internet protocol enabled device. The processor portion may also be configured to determine whether the communication is indicative of an emergency. The device may also include a communications portion that may be configured to establish the communication with at least one recipient associated with the designated recipient address via a second communication service operating on the internet protocol enabled device and at least one predetermined network upon the communication being determined to be indicative of an emergency.

Embodiments contemplate a computer readable storage medium, the computer readable storage medium having computer readable instructions stored thereon, the computer readable instructions when executed by at least one processor of an internet protocol enabled device causing the internet protocol enabled device to execute a method. The method may comprise providing an address of a designated recipient with which a communication is to be established to a first communication service operating on the internet protocol enabled device. The method may also comprise determining whether the communication is indicative of an emergency. In addition, the method may comprise establishing the communication with at least one recipient associated with the designated recipient address via a second communication service operating on the internet protocol enabled device and at least one predetermined network upon the communication being determined to be indicative of an emergency.

DETAILED DESCRIPTION OF ILLUSTRATIVE EMBODIMENTS

A detailed description of illustrative embodiments will now be described with reference to FIGS. 1-9. Although this description provides a detailed example of possible embodiments, it should be noted that the details are intended to be exemplary and in no way limit the scope of disclosed embodiments.

Figure 1:
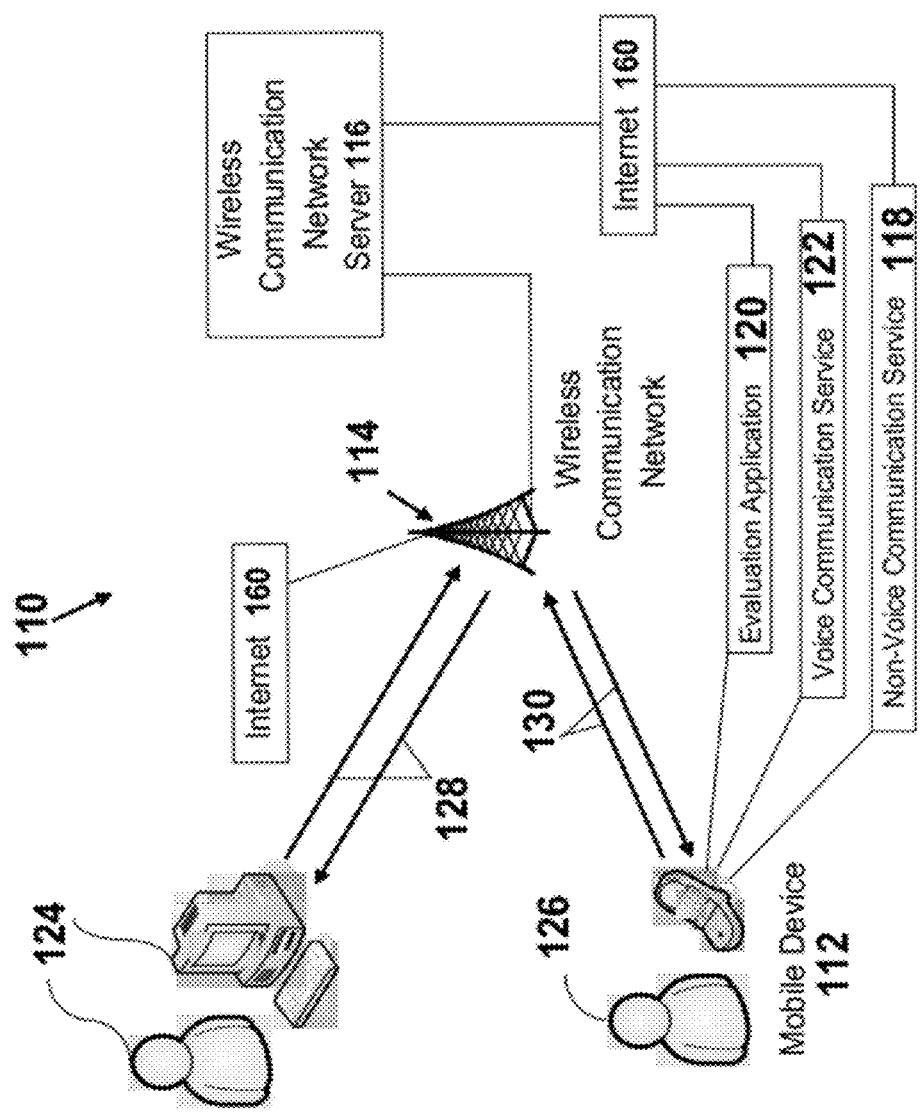
FIG. 1 depicts an overview of an architecture of a wireless communication system in which aspects of embodiments may be implemented.

FIG. 1 depicts an overview of a wireless communication system 110 in which embodiments may be implemented. The wireless communication system (WCS) 110 may include but is not limited to an internet protocol enabled device, like wireless mobile device 112, a wireless communication network (WCN) 114 and a wireless communication network server (WCNS) 116. The WCS 110 may also include one or more non-voice communications services 118, one or more evaluation applications 120, and one or more voice communication services 122 which may operate from the mobile device 112 and/or the Internet 160. A mobile device user 126, who might also be referred to as a WCS 110 or WCN 114 subscriber or more simply as a user, may interface with the WCN 114 through the wireless mobile device 112 which is in communication with the WCN 114 through wireless communication channel 130. Emergency responders (or emergency response entities) 124, such as public safety access points (PSAP) may also interface with the WCN 114 via a personal computer, among other devices, that may be in communication with the WCN 114 through communication channel 128.

Communication channels 128 and/or 130 may be part of one or more networks provided and operated by a same operator as the mobile device 112 or a different operator of the mobile device 112. Communication channels 128 and/or 130 may include, but are not limited to, an Internet 160 based connection, a wireless connection such as radio frequency for example, a telephone based dial-up connection or the like. Communication channels 128 and/or 130 may accommodate voice and/or non-voice communication. The WCNS 116 may be in communication with the Internet 160, and accordingly, the user 126 may in communication with the Internet 160 via mobile device 112, the WCN 114, and the WCNS 116, for example.

The mobile device 112 may be an internet protocol enabled device and may be one of, but not limited to, a cellular telephone, a cellular telephone in combination with another electronic device and a cellular telephone in combination with another wireless communication device. An internet protocol enabled device may be a device that communicates via a data network to the Internet 160, for example, using standardized protocols such as Hypertext Transfer Protocol (HTTP), Internet protocol version 4 (Ipv4), Internet protocol version 6 (Ipv6), Session Initiation Protocol (SIP), and the like. By way of example, and not limitation, cell phones may be combined with electronic devices such as digital cameras and wireless communication devices such as a Blackberry™. The mobile device 112 may include any hardware and/or software necessary for operating and/or controlling the mobile device 112. For example, the mobile device 112 may include a processing portion that may be individual digital logic components, a processor, a microprocessor, and application-specific integrated circuit (ASIC), and the like. The processing portion may include memory such as random access memory, register memory, cache memory and the like.

Memory may include computer executable attractions by which the processing portion may operate. For example, computer executable structures may include computer executable code that, when executed, operate the relevant actions associated with the processing portion.

Figure 2:
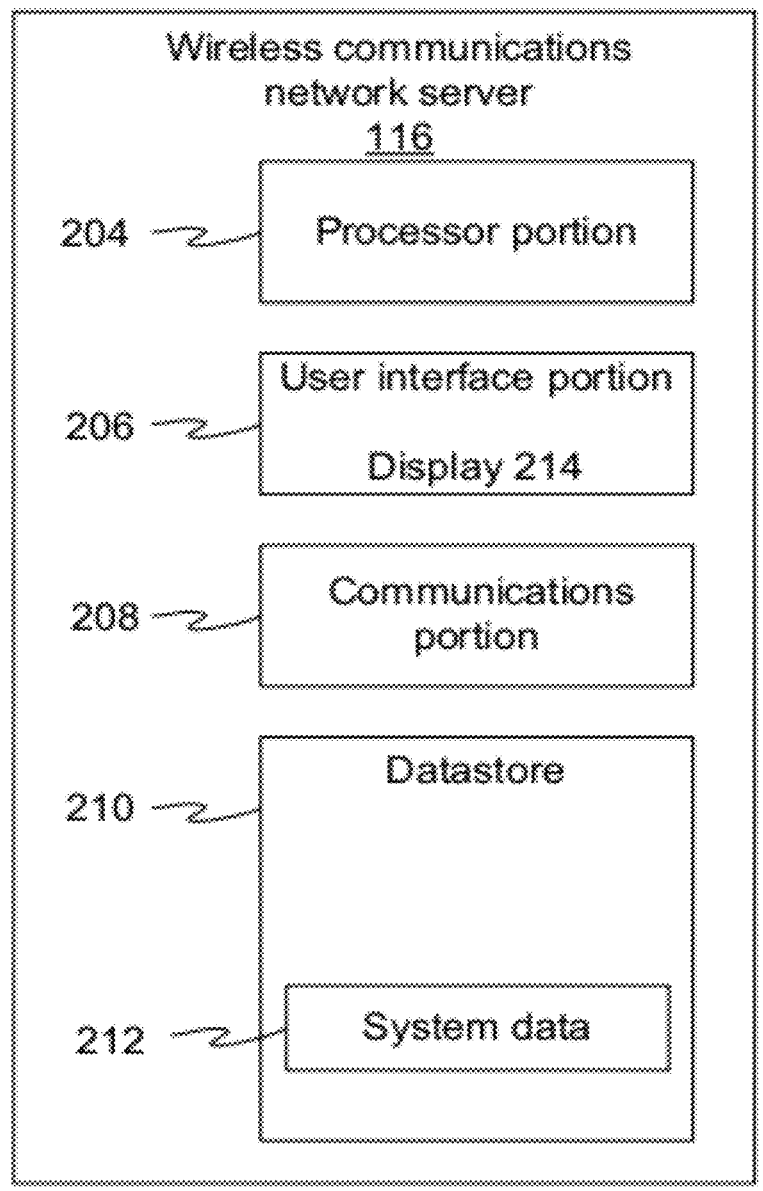
FIG. 2 depicts a block diagram of an illustrative wireless communication network server in which aspects of embodiments may be implemented.

FIG. 2 depicts a block diagram of an example WCNS 116 which may be implemented in embodiments. The WCNS 116 may be implemented as, but is not limited to, a network server, a network controller, a network switch or any component, system and/or subsystem capable of operating as the WCNS 116 is described in any of the embodiments. The WCNS 116 may also be in combination with another component of the WCN 114, such as but not limited to the Internet 160. The WCNS 116 may include a processing portion 204, a user interface portion 206, a communications portion 208, and a datastore portion 210. The datastore portion 210 may have stored thereon system data 212. In addition, the WCNS 116 may be comprised of components (described in further detail below) that are distributed among one or more elements in the WCN 114 (i.e., a network server, a network controller, a network switch, or the like).

The processing portion 204 may include any hardware and/or software necessary for operating and/or controlling the user interface portion 206, the communications portion 208 and the datastore portion 210. For example, the processing portion 204 may be individual digital logic components, one or more processors, one or more microprocessors, and application-specific integrated circuit (ASIC), and the like. The processing portion 204 may include memory such as random access memory, register memory, cache memory and the like. Memory may include computer executable instructions by which the processing portion 204 may operate. For example, computer executable instructions may include computer executable code that, when executed, operate the relevant actions associated with the processing portion 204. For example, the computer executable instructions may operate the methods provided in FIGS. 3-5.

The processor portion 204 may be in communication with the user interface portion 206, the communications portion 208 and/or the datastore portion 210. The processing portion 204 may control the user interface portion 206. For example, the processing portion 204 may direct the user interface portion 206 to output information visually, electronically and/or audibly, and the processing portion 204 may direct the user interface portion 206 to receive input from the user, perhaps through electronic means. The processing portion 204 may control the communications portion 208. For example, the processing portion 204 may send and/or receive data via the communications portion 208. The processing portion 204 may operate on the datastore 210 to detect events, invoke actions, apply exceptions, and/or receive overrides.

The user interface portion 206 may be, in any combination of hardware and/or software, any component, system and/or subsystem for receiving input from a user and outputting information to the user. The user interface portion 206 may include a display 214 and/or keyboard. The keyboard may be a numerical pad. For example, the user interface portion 206 may include a computer keypad, programmable softkeys, mechanical buttons, touch-screens, and/or the like. The user interface portion 206 may also include an electronic interface that may receive user instructions from the communications portion 208 that are sent from a remote location through the WCN 114, perhaps from the mobile device 112 or the PSAP 124. The display 214 may provide visual output and input, for example via a touch-screen. The user interface potion 206 may include a speaker for audio output. The user interface portion 206 may include a microphone for audible input.

The communications portion 208 may be, in any combination of hardware and/or software, any component, system, and/or subsystem for providing communications to and/or from the WCNS 116. The communication provided by the communications portion 208 may include, but is not limited to an Internet 160 based connection, a wireless connection such as radio frequency for example, a telephone based dial-up connection and the like. The communications portion 208 may provide a wireless communications channel between the WCNS 116 and a peer device (not shown) and/or the WCN 114. The communications portion 208 may provide point-to-point wireless communications between the WCNS 116 and a peer device. The wireless communications portion 208 may provide radio frequency (RF) communications between the WCNS 116 and the peer device. For example, the wireless communications portion may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+ Enhanced Data Rate (EDR), BLUETOOTH® 2.1+EDR, Institute of Electrical and Electronics Engineers, Inc. (IEEE) specification 802.15.1, or the like.

The communications portion 208 may also include individual digital logic components, a processor, a microprocessor, and application-specific integrated circuit (ASIC), and the like. The communications portion 208 may include memory such as random access memory, register memory, cache memory and the like. Memory may include computer executable instructions by which the communications portion 208 may operate. For example, computer executable instructions may include computer executable code that, when executed, operate the relevant actions associated with the communications portion 208.

Figure 7:
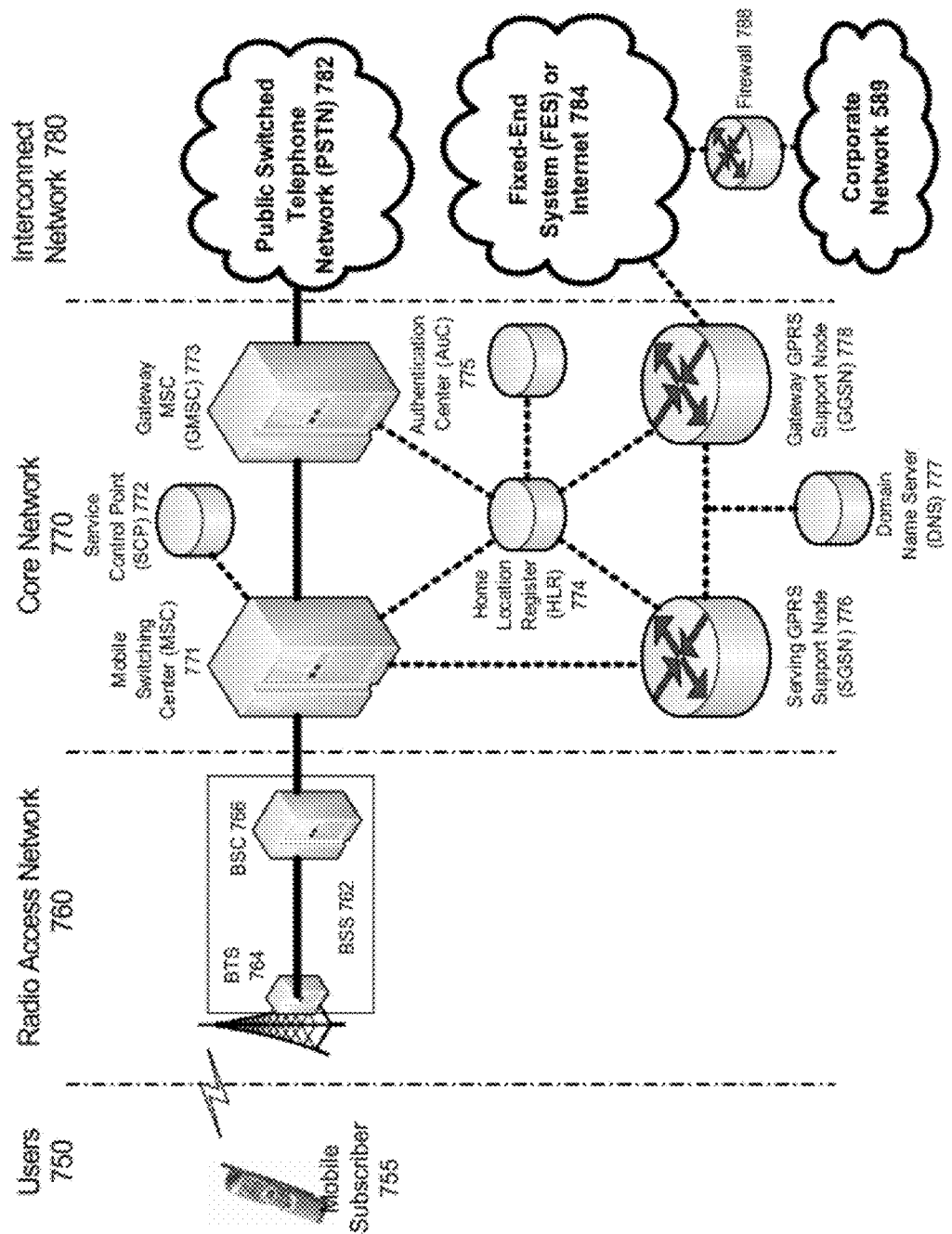
FIG. 7 depicts a GPRS network architecture in which aspects of an embodiment may be implemented.

The communications portion 208 may provide a wireless communications channel between the WCNS 116 and the WCN 114 such as the radio access network 760 (see FIG. 7). The communications portion 208 may provide cellular communications. The communication portion 208 may provide wireless data network communications such as, Wi-Fi (IEEE 802.11) and WiMAX (IEEE 802.16) for example.

The datastore 210 may be any component, system, and/or subsystem suitable for storing data. For example, the datastore portion 210 may include random access memory, flash memory, magnetic storage, and/or the like.

The datastore 210 may store thereon system data 212. The system data 212 may include contact information, e-mail data, spreadsheets, word processing data, task data, and/or the like.

Figure 2A:
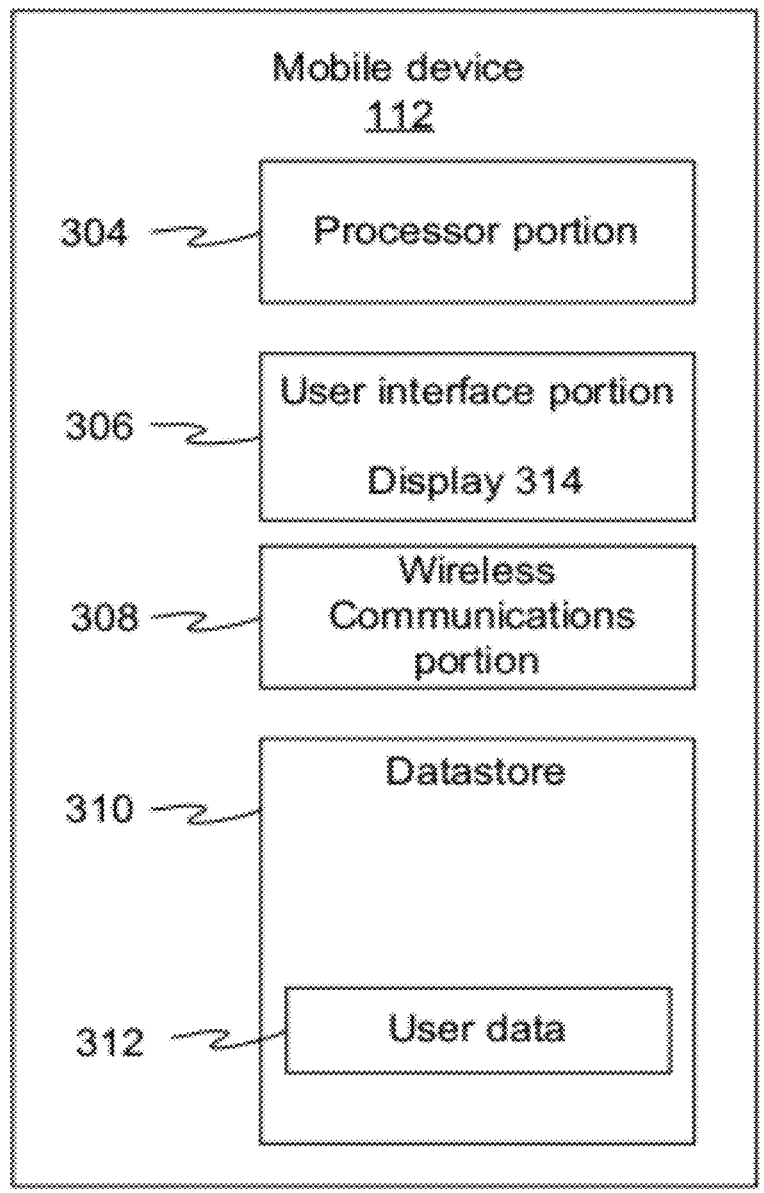
FIG. 2A depicts a block diagram of an illustrative mobile device in which aspects of embodiments may be implemented.

FIG. 2A depicts a block diagram of an example mobile device 112 which may be an internet protocol enabled device on which embodiments may be implemented. The mobile device 112 may include a processing portion 304, a user interface portion 306, a communications portion 308, and a datastore portion 310. The datastore portion 310 may have stored thereon user data 312.

The processing portion 304 may include any hardware and/or software necessary for operating and/or controlling the user interface portion 306, the wireless communications portion 308 and the datastore portion 310. For example, the processing portion 304 may be individual digital logic components, one or more processors, one or more microprocessors, and application-specific integrated circuit (ASIC), and the like. The processing portion 304 may include memory such as random access memory, register memory, cache memory and the like. Memory may include computer executable instructions by which the processing portion 304 may operate. For example, computer executable instructions may include computer executable code that, when executed, operate the relevant actions associated with the processing portion 304. Also by way of example, the computer executable instructions may operate the methods provided in FIGS. 3-5.

The processor portion 304 may be in communication with the user interface portion 306, the wireless communications portion 308 and/or the datastore portion 310. The processing portion 304 may control the user interface portion 306. For example, the processing portion 304 may direct the user interface portion 306 to output information visually and/or audibly, and the processing portion 304 may direct the user interface portion 306 to receive input from the user 126. The processing portion 304 may control the wireless communications portion 308. For example, the processing portion 304 may send and/or receive data via the wireless communications portion 308. The processing portion 304 may operate on the datastore 310 to detect events, invoke actions, apply exceptions, and/or receive overrides.

The user interface portion 306 may be, in any combination of hardware and/or software, any component, system and/or subsystem for receiving input from a user and outputting information to the user. The user interface portion 306 may include a display 314 and/or keyboard. The keyboard may be a numerical pad. For example, the user interface portion 306 may include a telephone keypad, programmable softkeys, operators such as but not limited to mechanical buttons and other input/out devices, touch-screens, and/or the like. The display may provide visual output in input, for example via a touch-screen. The user interface potion 306 may include a speaker for audio output. The user interface portion 306 may include a microphone for audible input.

The wireless communications portion 308 may be, in any combination of hardware and/or software, any component, system, and/or subsystem for providing wireless communications to and/or from the mobile device 112. The wireless communications portion 308 may provide a wireless communications channel between the mobile device 112 and a peer device (now shown) or the WCN 114. The wireless communications portion 308 may provide point-to-point wireless communications between the mobile device 112 and a peer device. The wireless communications portion 308 may provide radio frequency (RF) communications between the device and the peer device. For example, the wireless communications portion may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+ Enhanced Data Rate (EDR), BLUETOOTH® 2.1+EDR, Institute of Electrical and Electronics Engineers, Inc. (IEEE) specification 802.15.1, or the like.

The communications portion 308 may also include individual digital logic components, one or more processors, one or more microprocessors, and application-specific integrated circuit (ASIC), and the like. The communications portion 308 may include memory such as random access memory, register memory, cache memory and the like. Memory may include computer executable instructions by which the communications portion 308 may operate. For example, computer executable instructions may include computer executable code that, when executed, operate the relevant actions associated with the communications portion 308.

The wireless communications portion 308 may provide a wireless communications channel between the mobile device 112 and the WCN 114 such as the radio access network 760 (see FIG. 7). The wireless communications portion 308 may provide a cellular communications. The wireless communication portion 308 may provide wireless data network communications such as, Wi-Fi (IEEE 802.11) and WiMAX (IEEE 802.16) for example.

The datastore 310 may be any component, system, and/or subsystem suitable for storing data. For example, the datastore portion 310 may include random access memory, flash memory, magnetic storage, and/or the like.

The datastore 310 may store thereon user data 312. The user data 312 may include contact information, e-mail data, spreadsheets, word processing data, task data, and/or the like. In an embodiment, the processor may invoke an action to delete and/or encrypt the user data 312.

The WCNS 116 and/or the mobile device 112 may include a variety of computer readable media. Computer readable media may be any available media that may be accessed by the WCNS 116 and/or the mobile device 112 and may include both volatile and nonvolatile media, removable and non-removable media. By way of example, and not limitation, computer readable media may comprise computer readable storage media and communication media. Computer readable storage media may include volatile and/or nonvolatile media, and removable and non-removable media. Computer readable storage media may be utilized for storage of information such as computer readable instructions, data structures, program modules, or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, which may be used to store information and which may accessed by the WCNS 116 and/or the mobile device 112. A computer readable storage medium comprises a physical, tangible, concrete structure. As such, a computer readable storage medium is not a signal.

Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The processor portions 204 and/or 304 may include computer readable storage media in the form of volatile and/or nonvolatile memory such as read-only memory (ROM) and random access memory (RAM). A basic input/output system (BIOS), containing the basic routines that help to transfer information between elements within the WCNS 116 or the mobile device 112, such as during start-up, is typically stored in ROM. RAM typically contains data and/or program modules that may be immediately accessible to and/or presently being operated on by the processor 204 and/or 304.

The WCNS 116 and/or mobile device 112 may also include other removable/non-removable, volatile/nonvolatile computer readable storage media. By way of example only, a hard disk drive may read from or write to non-removable, nonvolatile magnetic media; a magnetic disk drive may read from or write to a removable, nonvolatile magnetic disk; and an optical disk drive may read from or write to a removable, nonvolatile optical disk such as a CD-ROM or other optical media. Other removable/non-removable, volatile/nonvolatile computer storage media that may be used in the WCNS 116 and/or mobile device 112 may include, but are not limited to, magnetic tape cassettes, flash memory cards, digital versatile disks, digital video tape, solid state RAM, solid state ROM, and the like.

Referring to FIGS. 1, 2, and 2A, embodiments contemplate that a user 126 of an internet protocol (IP) enabled device, such as mobile device 112, may encounter an emergency situation where voice communication or non-voice communication may be useful with an emergency responder or an emergency response center, such as a public safety access point or "PSAP" 124, for example. Non-voice communication may be useful due to the nature of the emergency, such as where a voice call to the PSAP 124 is not desirable (e.g., the user 126 may need to hide from an intruder in the user's house). Other emergency situations may permit the user to engage in a voice communication, such as with VoIP for example, with the PSAP 124.

Figure 3:
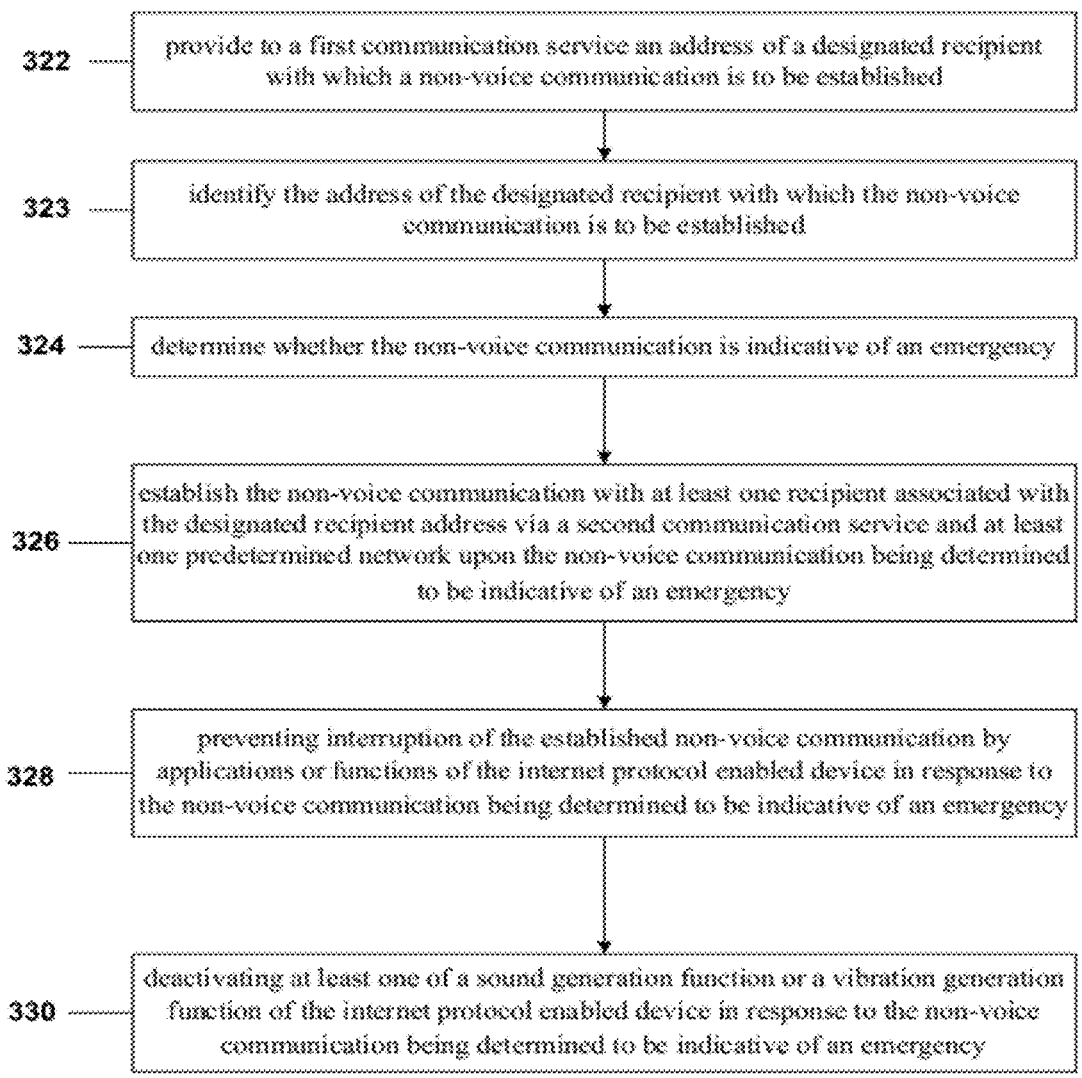
FIG. 3 depicts an illustration of methods consistent with embodiments.
Figure 4:
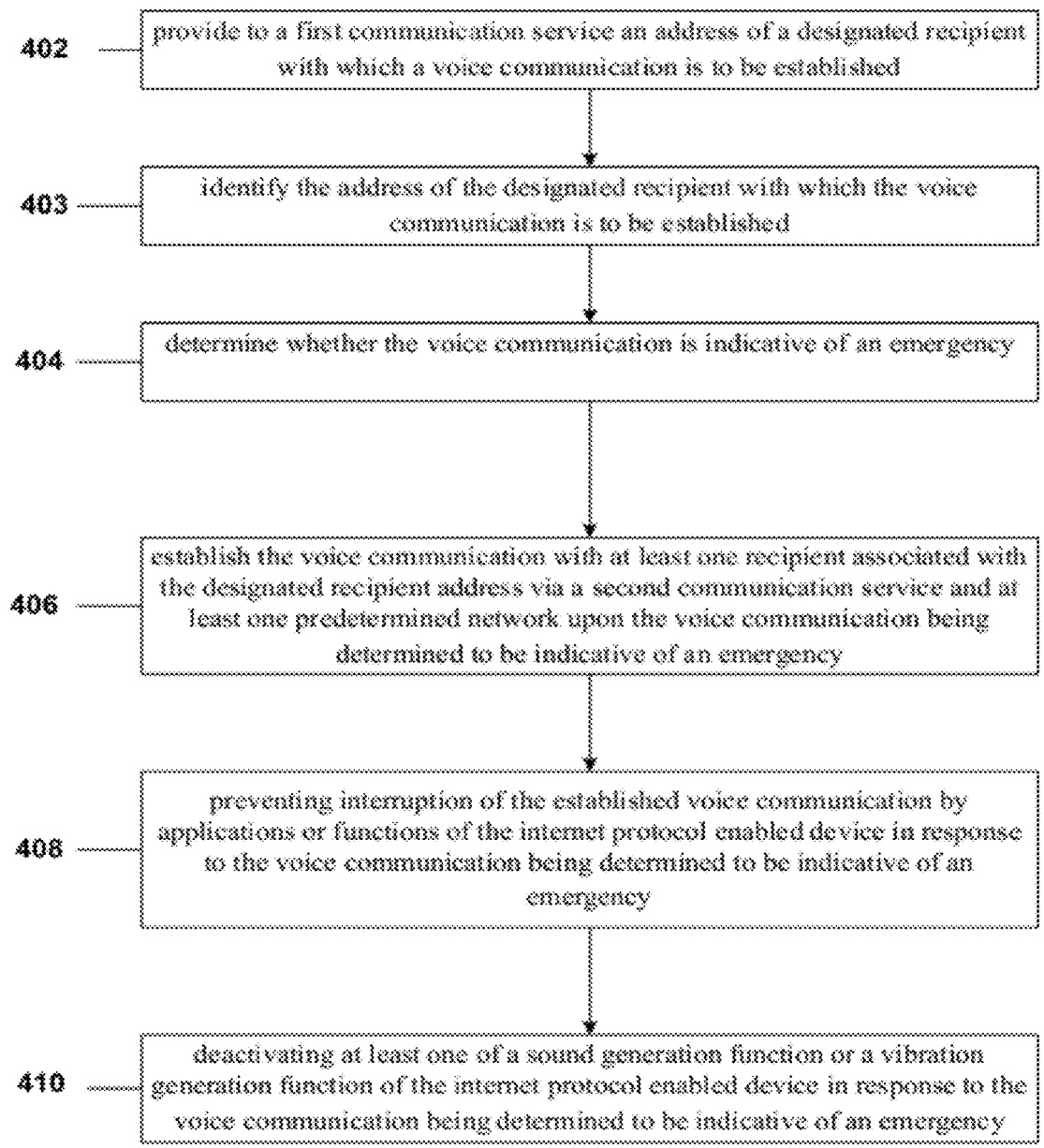
FIG. 4 depicts an illustration of methods consistent with embodiments.
Figure 5:
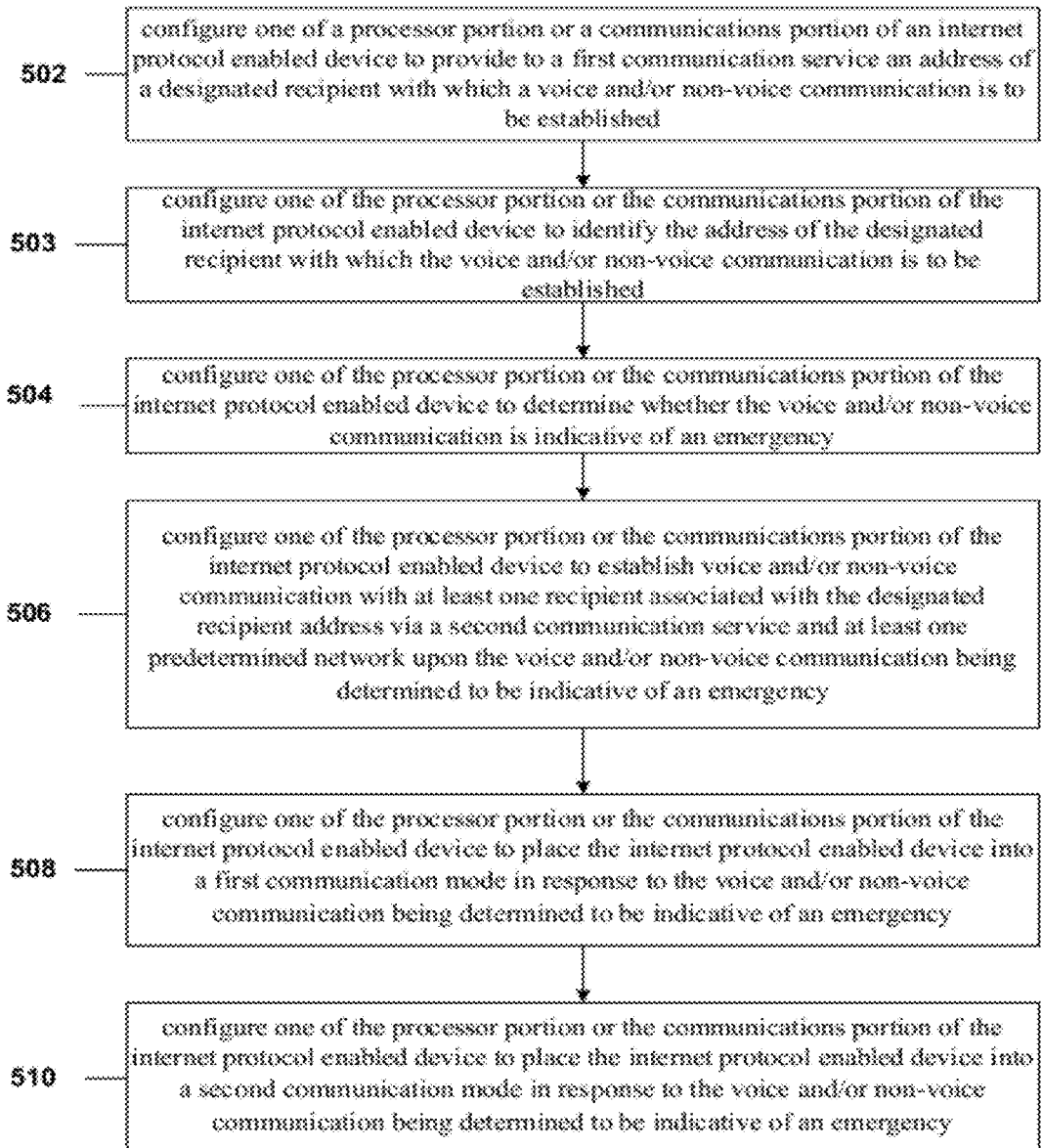
FIG. 5 depicts an illustration of methods consistent with embodiments.

Referring also now to FIGS. 3, 4, and 5, in situations in which non-voice emergency communication may be useful, embodiments contemplate that, at 322 the user 126 may enter, or input, to an internet protocol enabled device, like the mobile device 112, an address of a designated recipient with which the non-voice communication is to be established (e.g., the mobile device 112 may provide the input address to a first non-voice communication service 118). The first non-voice communication service 118 may be provided by a third party or by an operator of the mobile device 112. The non-voice emergency communication may be a text or multimedia message, for example. The address may be a special address or an address associated with a non-voice emergency message recipient such as by way of example, and not limitation, "911", "SOS", or "HELP", or the like. The mobile device 112 may include an address list, which may be a computer readable file or database for example, that may correlate the address with at least one designated recipient, such as the PSAP 124. Also, the mobile device 112 may correlate the input address with at least designated recipient by accessing information available from the WCN 114 or the Internet 160.

The user 126 may enter the body of the text or message to inform the designated recipient, for example the PSAP 124, of the nature of the emergency. The message creation may either be done as a non-session based message on the mobile device 112 (e.g., email) or may be part of a session based communication method such as instant messaging. The instant messaging functionality (or "non-voice communication service" 118) may be provided by third parties (e.g., an entity other than an operator of the mobile device 112 or other than an operator of the wireless (mobile) communication network 114) such as, by way of example and not limitation, AOL Instant Messenger, Yahoo! Messenger, Microsoft Windows Live Messenger, Google Talk, Jabber, or the like. Additionally, non-voice communication services 118 may be provided via third party social network services such as Facebook, My Space, Twitter, or the like. Third-party communication services 118 do not provide the mobile device user 126 with much or any confidentiality, privacy, or security. Also, non-voice communication services 118 may be provided by an operator of the internet protocol enabled device, like the mobile device 112.

At 323, the internet protocol enabled device, like the mobile device 112, may identify the address of the designated recipient with which the non-voice communication is to be established. Identifying the address of the designated recipient may include indentifying the input to one or more non-voice communication services 118 (third party provided or operator provided) that may be operating on the mobile device 112.

In those situations in which an emergency voice communication may be useful, the user 126 may, at 402, enter or input to the internet protocol enabled device, like mobile device 112, an address of a designated recipient with which the voice communication is to be established (e.g., the mobile device 112 may provide the input address to a first voice communication service 122). The first voice communication service 122 may be provided by a third party or by an operator of the mobile device 112. The address may be a special address or an address associated with a voice emergency message recipient such as by way of example, and not limitation, "911", "SOS", or "HELP", or the like. For example, the address for a designated recipient of a voice communication may be a dialed digit string (e.g., 911) or a VoIP address such as (e.g., "SOS", "HELP"). The mobile device 112 may use the address list that may correlate the address with at least one designated recipient (the address list may be used for both voice and non-voice communication). Also, as described previously, the mobile device 112 may access information available from the WCN 114 or the Internet 160 to correlate the address to at least one recipient. The address list may include correlations to recipients for voice and/or non-voice communication.

VoIP based communications or "voice communication services" 122 may be provided in a number of ways, including for example via third party applications such as but not limited to Skype or Vonage using the operator's network (wireless or otherwise) as a transport for the third party applications to communicate with third party networks or servers. Third-party communication services 122 do not provide the mobile device user 126 with much or any confidentiality, privacy, or security. Alternatively, VoIP based communications (or voice communication services 122) may be provided by the operator's VoIP services.

At 403, the internet protocol enabled device, like the mobile device 112, may identify the address of the designated recipient with which the voice communication is to be established. Identifying the address of the designated recipient may include indentifying the input to one or more voice communication services 122 (third party provided or operator provided) that may be operating on the mobile device 112.

At 502, at least one of the processor portion 304 or the communications portion 308 of the internet protocol enabled device, like mobile device 112, may be configured to provide to a first communication service the address of the designated recipient with which the voice and/or non-voice communication is to be established. At 503, at least one of the processor portion 304 or the communications portion 308 of the internet protocol enabled device, like mobile device 112, may be configured to identify the address of the designated recipient with which the voice and/or non-voice communication is to be established.

Embodiments contemplate that the non-voice communication or the voice communication may be determined to be associated with or indicative of an emergency situation or condition. Regarding a non-voice communication, at 324 the mobile device 112 may recognize or determine that one or more non-voice communication services 118 (whether provided by a third party or not) may be attempting to send a message to the special address for non-voice emergency texts or messages (e.g., determining whether the non-voice communication is indicative of an emergency). By way of example, and not limitation, the mobile device 112 may scan one or more addresses for outbound messages from the one or more non-voice communication services 118. In other words, determining whether the non-voice communication may be indicative of an emergency may include the mobile device 112 determining that at least one non-voice communication service 118 may associate the input address with at least one emergency response entity.

Alternatively, the mobile device 112 may receive an emergency indication from the one or more non-voice communication services 118. In other words, determining whether the non-voice communication is indicative of an emergency may include the mobile device 112 receiving from the at least one non-voice communication service 118 that the provided address may be associated with at least one an emergency response entity.

Embodiments contemplate that the mobile device 112 may include an emergency messaging application or "evaluation application" 120 that may determine that a message may be associated with, or indicative of, an emergency condition. In other words, the evaluation application 120 may determine that the non-voice communication may be an emergency text or message to the PSAP 124 for which a secure, confidential connection may be useful. In embodiments, the evaluation application 120 may determine that at least one non-voice communication service 118 may associate the input address with at least one emergency response entity. The evaluation application 120 may be operated or provided by a third party or by an operator of the internet protocol enabled device, like mobile device 112.

Embodiments contemplate that for voice communication, at 404 the mobile device 112 may recognize or determine that one or more voice communication services 122 (whether provided by a third party or not) may be attempting an emergency voice call (e.g., determine an emergency condition). By way of example, and not limitation, the mobile device 112 may scan of one or more of the input addresses such as the dialed digit string or the VoIP address. In other words, determining whether the voice communication may be indicative of an emergency may include the mobile device 112 determining that at least one voice communication service 122 may associate the input address with at least one emergency response entity.

Alternatively, the mobile device 112 may receive from the one or more voice communication services 122 an emergency indication. In other words, determining whether the voice communication is indicative of an emergency may include the mobile device 112 receiving from the at least one voice communication service 122 an indication that the provided address may be associated with at least one an emergency response entity. Whether the mobile device 112 determines that the voice communication may be an emergency call to the PSAP 124, or whether the mobile device 112 receives an indication from the voice communication service 122 that the voice communication may be a call to a PSAP 124, the mobile device 112 may determine that the voice communication may be a communication for which a secure, confidential connection may be useful.

At 504, at least one of the processor portion 304 or the communications portion 308 of the internet protocol enabled device, like mobile device 112, may be configured to determine whether the voice and/or non-voice communication is indicative of an emergency.

Embodiments also contemplate that the communications portion 308 and/or the processor portion 304 of the internet protocol enabled device, like the mobile device 112, may be configured to receive updates regarding the association of addresses of designated recipients with respective emergency response providers or entities. By way of example, the mobile device 112 may, perhaps at the command of the user 126, update the address list (described previously) of the mobile device 112. The update may provide the address list with updates of voice and/or non-voice communication addresses and the emergency responders that may be associated with (or correlated with) those updated addresses. One or more address lists may be stored in the datastore 310 of the mobile device 112. For example, should jurisdictions adopt a "711" address for voice and/or non-voice communication with a poison control center, the mobile device 112 may dynamically update its respective address list or lists accordingly. Also, as described previously, the mobile device 112 may access the WCN 114 and/or the Internet 160 to correlate an address with a respective recipient of voice or non-voice communication.

Also, embodiments contemplate that the communications portion 308 and/or the processor portion 304 of the mobile device 112 may be configured to translate input addresses of designated recipients or correlate input addresses of designated recipients to emergency responders based on geographical factors. By way of example, should a user 126 be traveling in the United Kingdom, the mobile device 112 and/or the evaluation application 120 (using position location functionality to determine a geographic location) may translate an input address of "911" to "999" or "112" so that a voice and/or non-voice communication may be established with a public safety access point in the United Kingdom, which may utilize "999" or "112" for a PSAP addresses, for example.

Alternatively, embodiments contemplate that one or more and perhaps all non-voice communication services 118 on the mobile device 112 may be configured to recognize the special addresses for non-voice emergency messages or texts (such as for example, to comply with a potential industry or legal standard). The one or more non-voice communication services 118 may also be configured to notify the mobile device 112 that the non-voice communication may be associated with the PSAP 124, or other emergency services provider. Therefore, embodiments contemplate that the mobile device 112 may receive an indication from the one or more non-voice communication services 118 that the provided address is associated with an emergency response entity. Upon receipt of such an indication, the mobile device 112 may direct the non-voice communication to the evaluation application 120 on the mobile device 112 so that a secure and/or confidential non-voice communication to the PSAP 124 (or one or more connections therefore) may be provided.

Similarly, embodiments contemplate that one or more of the voice communication services 122 on the mobile device 112 may be configured to recognize the special addresses for emergency voice communication (such as for example, to comply with a potential industry or legal standard) and to notify the mobile device 112 that an emergency voice communication to the PSAP 124, or other emergency services provider. Therefore, embodiments contemplate that the mobile device 112 may receive an indication from the one or more voice communication services 122 that the provided address is associated with an emergency response entity. Upon receipt of such an indication, the mobile device 112 may direct the voice communication to a voice communication service 122 operated by a provider of the mobile device 112 so that a secure and/or confidential voice communication to the PSAP 124 (or one or more connections therefore) may be provided.

Embodiments contemplate that, at 326, upon determining that a non-voice communication is associated with or indicative of an emergency condition, the evaluation application 120 on the mobile device 112 may establish non-voice communication (or one or more connections for non-voice communication) with the PSAP 124, or at least one recipient associated with the designated recipient address, via one or more second non-voice communication services 118 and at least one operator network. The one or more second non-voice communication services 118 may be provided by an operator of the mobile device 112 or the mobile network (in lieu of the third party providers of non-voice communication services 118, like AOL and Yahoo for example). The one or more second non-voice communication service 118 may be the evaluation application 120 itself or another non-voice communication service 118 provided by the operator of the mobile device 112. The one or more operator networks may be trusted networks, may be operated by the same entity as the operator of the mobile device 112, and may provide for secure and/or confidential non-voice communication between the mobile device 112 and the designated recipient.

As used in throughout this description, a trusted network may be a network that has a relationship with the mobile device 112 subscription and the wireless operator. Security, authentication, key management, and encryption may be provided by the trusted network to the mobile device 112. Secure and/or confidential non-voice or voice communication may be provided via security mechanisms including authentication, key management, and data encryption. Secure and/or confidential non-voice or voice communication may include the routing of messages over a trusted network.

Also, the one or more operator networks may be predetermined prior to the determination of the non-voice communication being indicative of an emergency or prior to the establishment of communication. Since secure and/or confidential non-voice communication may be established with the PSAP 124 (which may be considered to be a trusted entity), the mobile device 112 and evaluation application 120 in conjunction with the one or more operator networks may provide user 126 information to the PSAP 124 (e.g., location, call-back number, or the like) while maintaining user 126 privacy and/or confidentiality. The call-back number may be associated with non-voice communication so that the PSAP 124 may, at a later time, place a voice call back to the user 126 for follow-up activities. The established non-voice communication may include one-way or two-way communication.

Embodiments contemplate that upon determining that a voice communication is associated with or indicative of an emergency condition, the mobile device 112 may, at 406, establish voice communication (or one or more connections for voice communication) with the PSAP 124, or at least one recipient associated with the designated recipient address, via one or more second voice communication services 122 and at least one operator network. The one or more second voice communication services 122 may be provided by an operator of the mobile device 112 or the mobile network (in lieu of the third party providers of voice communication services 122, like Skype and Vonage, for example). The one or more operator networks may be trusted networks, may be operated by the same entity as the operator of the mobile device 112, and may provide for secure and/or confidential voice communication between the mobile device 112 and the designated recipient.

Embodiments also contemplate that the one or more operator networks may be predetermined prior to the determination of the voice communication being indicative of an emergency or prior to the establishment of communication. Since secure and/or confidential voice communication may be established with the PSAP 124 (which may be considered to be a trusted entity), the mobile device 112 in conjunction with the one or more operator networks (and perhaps in conjunction with a voice communication service 122 provided by the operator) may provide user 126 information to the PSAP 124 (e.g., location, call-back number, or the like) while maintaining user 126 privacy and confidentiality. The established voice communication may include one-way or two-way communication.

At 506, at least one of the processor portion 304 or the communications portion 308 of the internet protocol enabled device, like mobile device 112, may be configured to establish voice and/or non-voice communication with at least one recipient associated with the designated recipient address via a second communication service and at least one predetermined network upon the voice or non-voice communication being determined to be indicative of an emergency.

Also, mobile device users 126 may be confronted with emergency situations in which uninterrupted and inconspicuous voice or non-voice communication with emergency services providers may be useful in resolving the emergency. For example, should a mobile device user 126 suspect that a burglary or a home invasion is underway, the mobile device user 126 may wish to maintain uninterrupted communication with a 911 center while at the same time remaining hidden from detection by the burglar or home invader.

Embodiments contemplate that at least one processor portion 304 of an internet protocol enabled device, such as mobile device 112, may be configured to place the mobile device 112 into one or more communication modes, or combinations of communication modes, upon either the determination that the voice or non-voice communication is indicative of an emergency or upon the establishment of voice or non-voice emergency communication between the mobile device 112 and at least one designated recipient associated with the designated recipient address. Embodiments also contemplate that the user 126 may select, via the user interface portion 306, one or more of the communication modes prior to, or during, a voice or non-voice emergency communication.

By way of example, and not limitation, at 328 and/or 408, a first communication mode may prevent interruption of the established voice or non-voice communication by applications or functions of the internet protocol device, like mobile device 112, in response to the voice or non-voice communication being determined to be indicative of an emergency. In other words, one or all functions or activities which may cause a disruption or disconnection of the emergency voice or non-voice communication may be blocked. Also by way of example, at 330 and/or 410, a second communication mode may deactivate at least one of a sound generation function or a vibration generation function of the internet protocol enabled device, like the mobile device 112, in response to the voice or non-voice communication being determined to be indicative of an emergency. In other words, "normal" message notification methods such as beeps, key clicks, vibration, lights, or the like, may be disabled or silenced. By way of example, and not limitation, for non-voice emergency communications, perhaps in a "user hiding in closet with intruder in house" situation, the mobile device 112 may be placed in a silent mode so as to not reveal the user's hidden location to the intruder.

At 508, at least one of the processor portion 304 or the communications portion 308 of the internet protocol enabled device, like mobile device 112, may be configured to place the internet enabled device into the first communication mode. The first communication mode may prevent interruption of the established voice and/or non-voice communication by applications or functions of the internet protocol device in response to the voice and/or non-voice communication being determined to be indicative of an emergency. At 510, at least one of the processor portion 304 or the communications portion 308 of the internet protocol enabled device, like mobile device 112, may be configured to place the internet enabled device into the second communication mode. The second communication mode may deactivate at least one of a sound generation function or a vibration generation function of the internet protocol enabled device in response to the voice and/or non-voice communication being determined to be indicative of an emergency.

Embodiments also contemplate that a user's 126 special needs, such as but not limited to visual impairment or hearing impairment, may be accommodated by one or more of the communication modes. For example, a third communication mode may disable sound generation functions of the internet protocol enabled device, like the mobile device 112, other than those functions that may permit a visually impaired user 126 to utilize devices such as earphones to communicate with the PSAP 124. Also by way of example, other communication modes may disable vibration and light generating functions of the of the internet protocol enabled device, like the mobile device 112, other than those functions that may permit a hearing impaired user to detect that a non-voice emergency communication has been established with the PSAP 124, such as the illumination of the mobile device's 112 user interface display 314.

Embodiments contemplate that a user 126 may prefer confidential and/or private voice or non-voice communication with designated recipients other than emergency providers. By way of example, and not limitation, a user 126 may prefer confidential and/or private voice and/or non-voice communication with employers, colleagues, family members, trusted confidants, doctors, and/or providers of professional services such as but not limited to accountants, investment advisors, lawyers, or the like. Embodiments contemplate that the user 126 may customize the address list (described previously) to add voice and/or non-voice addresses of those parties with which confidential and/or private voice and/or non-voice communication is desired. For example, the user may add her sister's voice address (e.g., cell phone number) to the address list. Also by way of example, the user 126 may add her accountant's text address to the address list.

By doing so, embodiments contemplate that should the user input an address of a designated recipient into a voice communication service 122 (perhaps provided by a third party) on the mobile device 112, the mobile device 112 may identify the address of the designated recipient and may determine by reference to the address list that the voice communication is indicative of a predetermined requirement of confidentiality. Further, the mobile device 112 may establish the voice communication with at least one recipient associated with the designated recipient address via at least one predetermined network upon determining that the voice communication is indicative of a requirement of confidentiality (and perhaps in lieu of the third party voice communication service 122). Also, as described previously, the predetermined network may be be provided by an operator of the mobile device 112 and may provide confidential and/or secure voice communication between the mobile device 112 and the at least one recipient. For example, should the user 126 input her sister's cell phone number into Skype (installed on the user's mobile device 112), the call may be established via one or more mobile device 112 operator networks and not via Skype.

Embodiments contemplate that at least one of the processor portion 304 or the communications portion 308 of the mobile device 112 may be configured to accept user 126 customization of the address list by way of, for example and not limitation, the user interface portion 306 of the mobile device 112.

The elements described herein including those reflected in FIGS. 3, 4, and 5 and are not contemplated as being exclusive and each respective element may be combined, in whole or in part, with other elements described herein including those not reflected in FIGS. 3, 4, and 5. Also, the respective elements described herein including those reflected in FIGS. 3, 4, and 5 are not contemplated as being necessarily performed, either individually or in combination.

The following description sets forth some exemplary telephony radio networks and non-limiting operating environments for the wireless communications system (WCN) 110. The below-described operating environments should be considered non-exhaustive, however, and thus the below-described network architectures merely show how the above described embodiments of the WCNS 116 and/or the mobile device 112 may be incorporated into existing network structures and architectures. It may be appreciated, however, that the above described embodiments of the WCNS 116 and/or the mobile device 112 may be incorporated into existing and future alternative architectures for wireless communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art may appreciate, the exemplary GSM/GPRS environment and services described herein also may be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the above described embodiments of the WCNS 116 and/or the mobile device 112 may be applied independently of the method for data transport, and do not depend on any particular network architecture, or underlying protocols.

Figure 6:
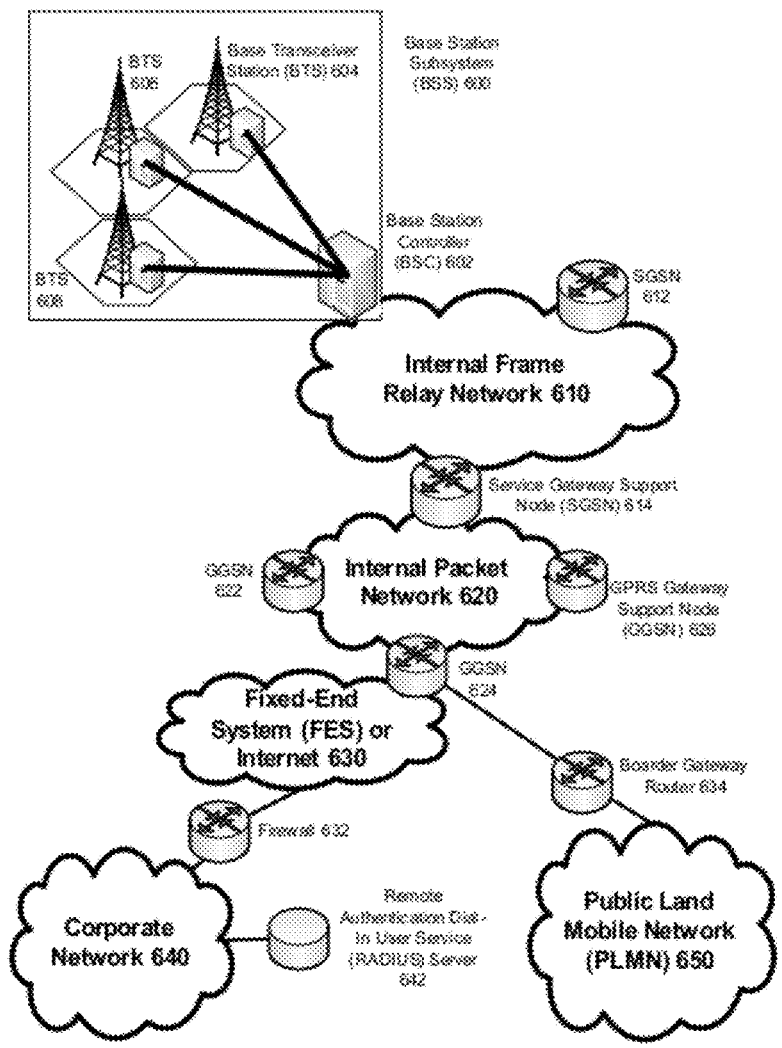
FIG. 6 depicts an overview of a network environment in which aspects of embodiments may be implemented.

FIG. 6 depicts an overall block diagram of an exemplary packet-based mobile cellular network environment, such as a GPRS network, in which the system for implementing a configuration of the above wireless communication system 110 may be practiced. In an example configuration, the above described embodiments of the WCNS 116 are encompassed by elements of the network environment depicted in FIG. 6. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices become connected to the wireless network. In exemplary fashion, the packet traffic originating from user devices is transported via an over-the-air interface to a BTS 608, and from the BTS 608 to the BSC 602. Base station subsystems, such as BSS 600, are a part of internal frame relay network 610 that may include Service GPRS Support Nodes ("SGSN") such as SGSN 612 and 614. Each SGSN is connected to an internal packet network 620 through which a SGSN 612, 614, etc. may route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630 (or the Internet 160). As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

FIG. 7 illustrates an architecture of a typical GPRS network as segmented into four groups: users 750, radio access network 760, core network 770, and interconnect network 780. In an example configuration the wireless communication system 110, the system is encompassed by the radio access network 760, core network 770, and interconnect network 780. Users 750 comprise a plurality of end users (though only mobile subscriber 755 is shown in FIG. 7). In an example embodiment, the device depicted as mobile subscriber 755 may comprise the user 126 and/or the mobile device 112. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784 (or the Internet 160), firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772.

The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user, like the above described user 126, and sometimes to the actual portable device, such as the above described mobile device 112, used by an end user of the mobile cellular service. Different element numbers may be used. When a mobile subscriber turns on his or her mobile device, the mobile device goes through an attach process by which the mobile device attaches to an SGSN of the GPRS network. In FIG. 7, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which may be corporate network 789 in FIG. 6) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 may access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 may then go through radio access network 760, core network 770, and interconnect network 780, in a particular fixed-end system or Internet 784 (or the Internet 160) and firewall 788, to reach corporate network 789.

Thus, network elements that may invoke the functionality of the above described wireless communication system 110 and the embodiments of the WCNS 116 and/or the mobile device 112 may include but are not limited to Gateway GPRS Support Node tables, Fixed End System router tables, firewall systems, VPN tunnels, and any number of other network elements as required by the particular digital network.

Figure 8:
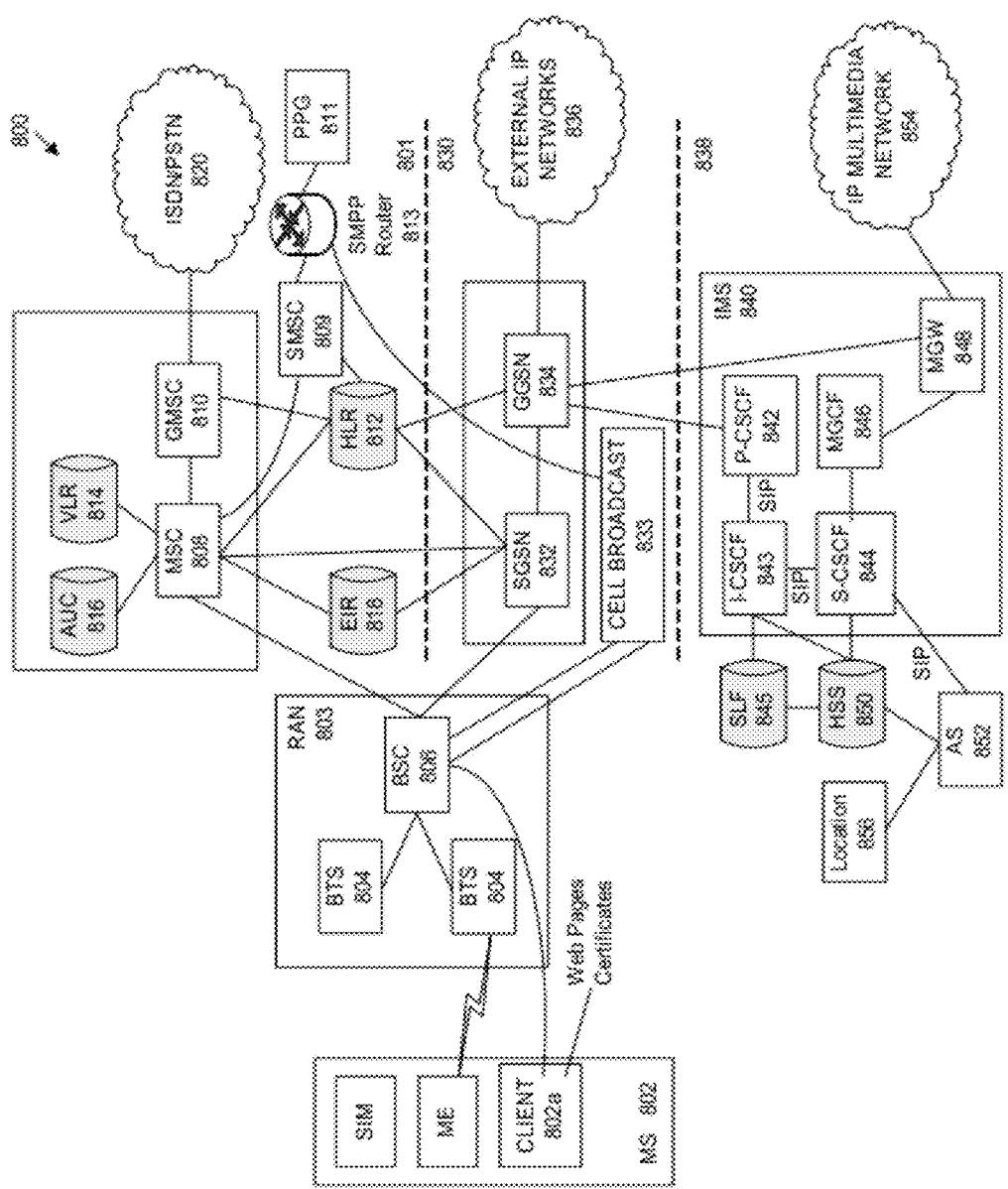
FIG. 8 depicts an alternate block diagram of an example GSM/GPRS/IP multimedia network architecture in which aspects of an embodiment may be implemented.

FIG. 8 illustrates another exemplary block diagram view of a GSM/GPRS/IP multimedia network architecture 800 in which the above described embodiments of the WCNS 116 and/or the mobile device 112 may be incorporated. As illustrated, architecture 800 of FIG. 8 includes a GSM core network 801, a GPRS network 830 and an IP multimedia network 838. The GSM core network 801 includes a Mobile Station (MS) 802, at least one base Transceiver Station (BTS) 804 and a Base Station Controller (BSC) 806. The WCNS 116 may be implemented in the BSC 806. The MS 802 is physical equipment or Mobile Equipment (ME), such as a mobile phone (such as mobile device 112) or a laptop computer that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides inter-working functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS also supports simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS may only use one of the two services at a given time.

A class C MS may attach for only one of the GPRS services and GSM services at a time. Simultaneous attachment and operation of GPRS services and GSM services is not possible with a class C MS.

A GPRS network 830 may be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS may monitor pages for a circuit switched network while received data and vise versa.

The IP multimedia network 838 includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 9:
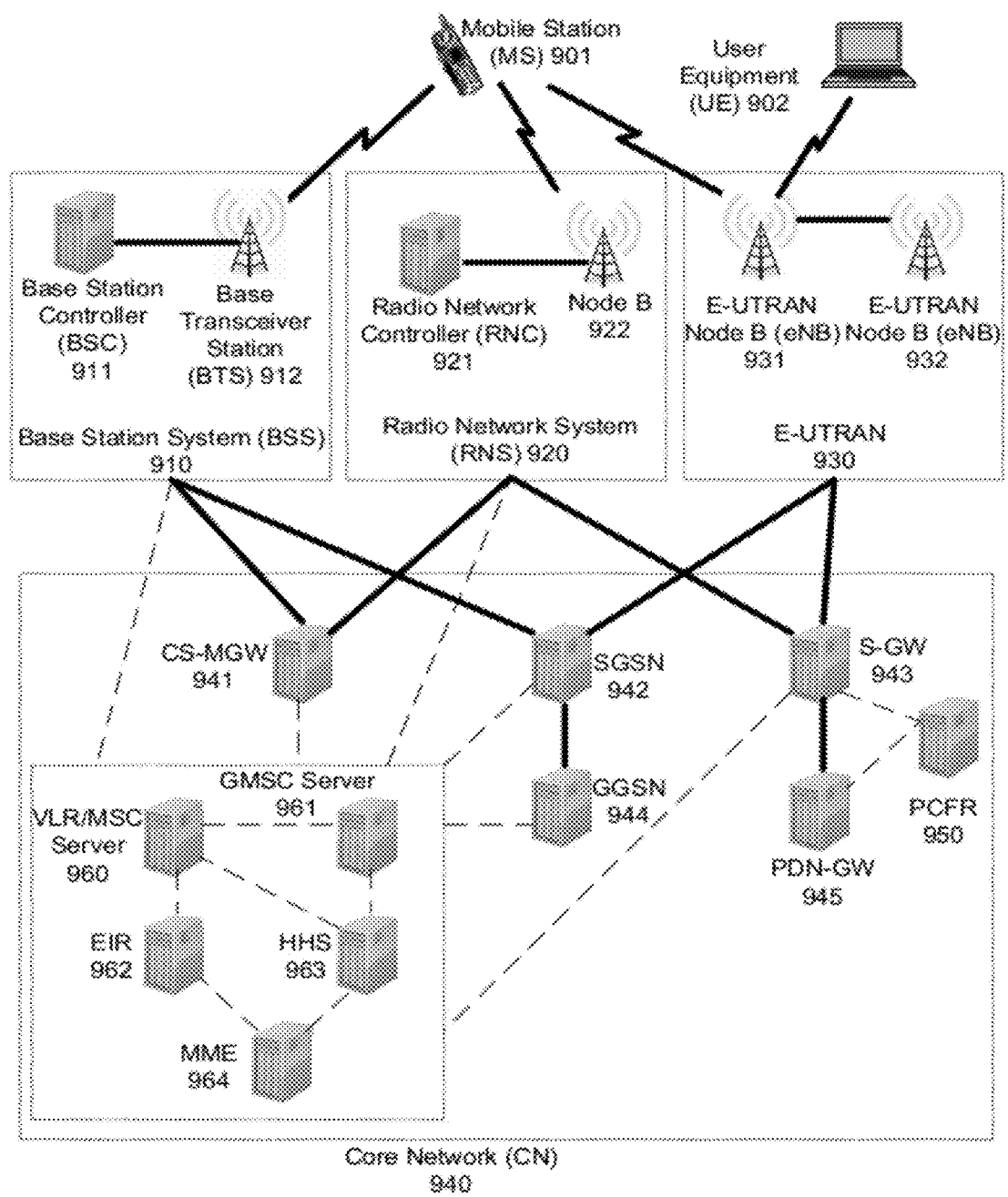
FIG. 9 depicts a block diagram of an example Public Land Mobile Network (PLMN) architecture in which aspects of an embodiment may be implemented.

FIG. 9 illustrates a PLMN block diagram view of an exemplary architecture in which the above described embodiments of the WCNS 116 and/or the mobile device 112 may be incorporated. Mobile Station (MS) 901 is the physical equipment used by the PLMN subscriber. In one illustrative embodiment, Mobile Device 112 of FIG. 1 may serve as Mobile Station 901. Mobile Station 901 may be one of, but not limited to, a cellular telephone, a cellular telephone in combination with another electronic device or any other wireless mobile communication device.

Mobile Station 901 may communicate wirelessly with Base Station System (BSS) 910. BSS 910 contains a Base Station Controller (BSC) 911 and a Base Transceiver Station (BTS) 912. BSS 910 may include a single BSC 911/BTS 912 pair (Base Station) or a system of BSC/BTS pairs which are part of a larger network. BSS 910 is responsible for communicating with Mobile Station 901 and may support one or more cells. BSS 910 is responsible for handling cellular traffic and signaling between Mobile Station 901 and Core Network 940. Typically, BSS 910 performs functions that include, but are not limited to, digital conversion of speech channels, allocation of channels to mobile devices, paging, and transmission/reception of cellular signals.

Additionally, Mobile Station 901 may communicate wirelessly with Radio Network System (RNS) 920. RNS 920 contains a Radio Network Controller (RNC) 921 and one or more Node(s) B 922. RNS 920 may support one or more cells. RNS 920 may also include one or more RNC 921/Node B 922 pairs or alternatively a single RNC 921 may manage multiple Nodes B 922. RNS 920 is responsible for communicating with Mobile Station 901 in its geographically defined area. RNC 921 is responsible for controlling the Node(s) B 922 that are connected to it and is a control element in a UMTS radio access network. RNC 921 performs functions such as, but not limited to, load control, packet scheduling, handover control, security functions, as well as controlling Mobile Station 901's access to the Core Network (CN) 940.

The evolved UMTS Terrestrial Radio Access Network (E-UTRAN) 930 is a radio access network that provides wireless data communications for Mobile Station 901 and User Equipment 902. E-UTRAN 930 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 930 may include of series of logical network components such as E-UTRAN Node B (eNB) 931 and E-UTRAN Node B (eNB) 932. E-UTRAN 930 may contain one or more eNBs. User Equipment 902 may be any user device capable of connecting to E-UTRAN 930 including, but not limited to, a personal computer, laptop, mobile device, wireless router, or other device capable of wireless connectivity to E-UTRAN 930. The improved performance of the E-UTRAN 930 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 901 may communicate with any or all of BSS 910, RNS 920, or E-UTRAN 930. In a illustrative system, each of BSS 910, RNS 920, and E-UTRAN 930 may provide Mobile Station 901 with access to Core Network 940. The Core Network 940 may include of a series of devices that route data and communications between end users. Core Network 940 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 941 is part of Core Network 940, and interacts with Visitor Location Register (VLR) and Mobile-Services Switching Center (MSC) Server 960 and Gateway MSC Server 961 in order to facilitate Core Network 940 resource control in the CS domain. Functions of CS-MGW 941 include, but are not limited to, media conversion, bearer control, payload processing and other mobile network processing such as handover or anchoring. CS-MGW 940 may receive connections to Mobile Station 901 through BSS 910, RNS 920 or both.

Serving GPRS Support Node (SGSN) 942 stores subscriber data regarding Mobile Station 901 in order to facilitate network functionality. SGSN 942 may store subscription information such as, but not limited to, the International Mobile Subscriber Identity (IMSI), temporary identities, or Packet Data Protocol (PDP) addresses. SGSN 942 may also store location information such as, but not limited to, the Gateway GPRS Support Node (GGSN) 944 address for each GGSN where an active PDP exists. GGSN 944 may implement a location register function to store subscriber data it receives from SGSN 942 such as subscription or location information.

Serving Gateway (S-GW) 943 is an interface which provides connectivity between E-UTRAN 930 and Core Network 940. Functions of S-GW 943 include, but are not limited to, packet routing, packet forwarding, transport level packet processing, event reporting to Policy and Charging Rules Function (PCRF) 950, and mobility anchoring for inter-network mobility. PCRF 950 uses information gathered from S-GW 943, as well as other sources, to make applicable policy and charging decisions related to data flows, network resources and other network administration functions. Packet Data Network Gateway (PDN-GW) 945 may provide user-to-services connectivity functionality including, but not limited to, network-wide mobility anchoring, bearer session anchoring and control, and IP address allocation for PS domain connections.

Home Subscriber Server (HSS) 963 is a database for user information, and stores subscription data regarding Mobile Station 901 or User Equipment 902 for handling calls or data sessions. Networks may contain one HSS 963 or more if additional resources are required. Exemplary data stored by HSS 963 include, but is not limited to, user identification, numbering and addressing information, security information, or location information. HSS 963 may also provide call or session establishment procedures in both the PS and CS domains.

The VLR/MSC Server 960 provides user location functionality. When Mobile Station 901 enters a new network location, it begins a registration procedure. A MSC Server for that location transfers the location information to the VLR for the area. A VLR and MSC Server may be located in the same computing environment, as is shown by VLR/MSC Server 960, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 901 registration or procedures for handover of Mobile Station 901 to a different section of the Core Network 940. GMSC Server 961 may serve as a connection to alternate GMSC Servers for other mobile stations in larger networks.

Equipment Identity Register (EIR) 962 is a logical element which may store the International Mobile Equipment Identities (IMEI) for Mobile Station 901. In a typical embodiment, user equipment may be classified as either "white listed" or "black listed" depending on its status in the network. In one embodiment, if Mobile Station 901 is stolen and put to use by an unauthorized user, it may be registered as "black listed" in EIR 962, preventing its use on the network. Mobility Management Entity (MME) 964 is a control node which may track Mobile Station 901 or User Equipment 902 if the devices are idle. Additional functionality may include the ability of MME 964 to contact an idle Mobile Station 901 or User Equipment 902 if retransmission of a previous session is required.

While the various embodiments have been described in connection with the embodiments of the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed:

1. A method performed by a system comprising at least one processor, the method comprising:
   providing, by the system, an address of equipment of a designated recipient with which a communication is to be established to a first communication service operating on an internet protocol enabled device, wherein the address of the equipment of the designated recipient is associated with at least one public safety access point;
   determining, by the system, that the communication is indicative of an emergency; and
   establishing, by the system, the communication with at least one recipient associated with the address of the equipment of the designated recipient via a second communication service operating on the internet protocol enabled device and at least one predetermined network upon the communication being determined to be indicative of the emergency.

2. The method of claim 1, wherein the communication is at least one of a non-voice communication or a voice communication.

3. The method of claim 1, wherein the at least one predetermined network is provided by an operator of the internet protocol enabled device, and the at least one predetermined network provides the communication between the internet protocol enabled device and the at least one recipient securely.

4. The method of claim 1, wherein the first communication service is provided by a party other than an operator of the internet protocol enabled device and the second communication service is provided by the operator of the internet protocol enabled device.

5. The method of claim 4, wherein the determining whether the communication is indicative of the emergency includes the internet protocol enabled device determining that the first communication service associates the address with at least one emergency response entity.

6. The method of claim 4, wherein determining whether the communication is indicative of an emergency includes the internet protocol enabled device receiving an indication from the first communication service that the address is associated with at least one emergency response entity.

7. The method of claim 1, further including:
   preventing interruption of the communication by applications or functions of the internet protocol enabled device in response to the communication being determined to be indicative of the emergency.

8. The method of claim 1, further including:
   deactivating at least one of a sound generation function or a vibration generation function of the internet protocol enabled device in response to the communication being determined to be indicative of the emergency.

9. The method of claim 1, wherein the internet protocol enabled device is a wireless mobile device.

10. A computer readable storage medium, the computer readable storage medium having computer readable instructions stored thereon, the computer readable instructions when executed by at least one processor of an internet protocol enabled device causing the internet protocol enabled device to perform operations, the operations comprising:
    providing an address of equipment of a designated recipient with which a communication is to be established to a first communication service operating on the internet protocol enabled device, wherein the address of the equipment of the designated recipient is associated with at least one public safety access point;
    determining that the communication is indicative of an emergency; and
    establishing the communication with at least one recipient associated with the address of the equipment of the designated recipient via a second communication service operating on the internet protocol enable device and at least one predetermined network upon the communication being determined to be indicative of the emergency.

11. The storage medium of claim 10, wherein the first communication service is provided by a party other than an operator of the internet protocol enabled device and the second communication service is provided by the operator of the internet protocol enabled device.

12. The storage medium of claim 11, wherein the determining whether the communication is indicative of the emergency includes the internet protocol enabled device determining that the first communication service associates the input with at least one emergency response entity.

13. The storage medium of claim 10, wherein the communication is at least one of a non-voice communication or a voice communication.

14. The storage medium of claim 10, wherein the at least one predetermined network is provided by an operator of the internet protocol enabled device, and the at least one predetermined network provides the communication between the internet protocol enabled device and the at least one recipient securely.

15. The storage medium of claim 10, the operations further comprising:
placing the internet enabled device into a first communication mode, the first communication mode preventing interruption of the communication by applications or functions of the internet protocol device in response to the communication being determined to be indicative of an emergency.

16. An internet protocol enabled device comprising:
a processor portion configured to:
provide an address of equipment of a designated recipient with which a communication is to be established to a first communication service operating on the internet protocol enabled device, wherein the address of the equipment of the designated recipient is associated with at least one public safety access point, and
determine that the communication is indicative of an emergency; and
a communications portion configured to:
establish the communication with at least one recipient associated with the address of the designated recipient via a second communication service operating on the internet protocol enabled device and at least one predetermined network upon the communication being determined to be indicative of the emergency.

17. The device of claim 16, wherein the communication is at least one of a non-voice communication or a voice communication.

18. The device of claim 16, wherein the first communication service is provided by a party other than an operator of the internet protocol enabled device and the second communication service is provided by the operator of the internet protocol enabled device.

19. The device of claim 16, wherein the at least one predetermined network is provided by an operator of the internet protocol enabled device, and the at least one predetermined network providing the communication between the internet protocol enabled device and the at least one recipient securely.

* * * * *